United States Patent
Lee et al.

(10) Patent No.: US 9,823,700 B2
(45) Date of Patent: Nov. 21, 2017

(54) DISPLAY APPARATUS

(71) Applicant: SAMSUNG DISPLAY CO., LTD., Yongin, Gyeonggi-Do (KR)

(72) Inventors: Jusuck Lee, Seoul (KR); Youn Joon Kim, Seoul (KR); Kyunghyun Baek, Suwon-si (KR); Yoonjee Shin, Ulsan (KR); Sangjo Lee, Hwaseong-si (KR); Junghun Lee, Hwaseong-si (KR); Mi Jang, Suwon-si (KR); Kyungmin Choi, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 137 days.

(21) Appl. No.: 14/793,937

(22) Filed: Jul. 8, 2015

(65) Prior Publication Data

US 2016/0139633 A1    May 19, 2016

(30) Foreign Application Priority Data

Nov. 17, 2014    (KR) .................. 10-2014-0159966

(51) Int. Cl.
*G09G 3/04* (2006.01)
*G06F 1/16* (2006.01)

(52) U.S. Cl.
CPC ................... *G06F 1/1652* (2013.01)

(58) Field of Classification Search
CPC ............... G06F 1/1652; G06F 1/1622
See application file for complete search history.

(56) References Cited

U.S. PATENT DOCUMENTS

| | | | |
|---|---|---|---|
| 8,001,711 B2 | 8/2011 | Lafarre et al. | |
| 8,511,302 B2 | 8/2013 | Parkes | |
| 2006/0007368 A1* | 1/2006 | Slikkerveer | G09F 9/35 349/58 |
| 2007/0216639 A1* | 9/2007 | LaFarre | G02F 1/167 345/107 |
| 2011/0227822 A1* | 9/2011 | Shai | G06F 1/1615 345/156 |
| 2014/0042293 A1 | 2/2014 | Mok et al. | |
| 2015/0340004 A1* | 11/2015 | Pang | G09G 5/00 345/205 |

FOREIGN PATENT DOCUMENTS

| | | |
|---|---|---|
| KR | 10-2007-0092597 A | 9/2007 |
| KR | 10-0818170 B1 | 3/2008 |
| KR | 10-2011-0039217 A | 4/2011 |
| KR | 10-2013-0028453 A | 3/2013 |

* cited by examiner

*Primary Examiner* — Towfiq Elahi
(74) *Attorney, Agent, or Firm* — Lee & Morse, P.C.

(57) ABSTRACT

A display apparatus includes a flexible display part expressing images, a housing accommodating the display part, the display part being drawn into and out of the housing, a revolving part in the housing, the display part being wound on the revolving part in a predetermined rotation direction, a fixing part in the housing, the fixing part securing the display part when fully spread out, and a pressing part connected to an interior of the housing, the pressing part pressing the fixing part toward the revolving part.

20 Claims, 11 Drawing Sheets

DISPLAY APPARATUS

CROSS-REFERENCE TO RELATED APPLICATION

Korean Patent Application No. 10-2014-0159966, filed on Nov. 17, 2014, in the Korean Intellectual Property Office, and entitled: "Display Apparatus," is incorporated by reference herein in its entirety.

BACKGROUND

1. Field

Embodiments described herein relate to a display apparatus, and more particularly, to a display apparatus exhibiting simplified use.

2. Description of the Related Art

In recent years, there have been developed many kinds of flexible display apparatuses which are bendable and more convenient for use. For example, such flexible display apparatuses include curved displays with specific curvatures, foldable displays that curve over specific curvatures or bend on a folding axis, and rollable displays that are wound at specific curvatures. Among them, the rollable display apparatuses are regarded as useful for widening display areas and improving portability thereof.

SUMMARY

In an embodiment, a display apparatus may including a flexible display part expressing images, a housing accommodating the display part, the display part being drawn into and out of the housing, a revolving part in the housing, the display part being wound on the revolving part in a predetermined rotation direction, a fixing part in the housing, the fixing part securing the display part when fully spread out, and a pressing part connected to an interior of the housing, the pressing part pressing the fixing part toward the revolving part.

The display apparatus may further include a grip linking up with the display part. The display part may include a long side extending along a first direction; and a short side extending along a second direction. One side of the display part may be connected with the housing in the first direction. The other side of the display part may be connected with the grip in the first direction.

The housing may include an opening formed on a side of the housing, into and out of which the display part is drawn.

The housing may further including an upper housing; and a lower housing connected with the bottom of the upper housing. The opening may be formed at a side of the upper housing in the first direction. The grip may be longer than the opening in the second direction.

The revolving part may including a roll shaped in a cylinder extending toward the second direction and having an outer surface on which the display part is wound; and an axis penetrating the roll in the second direction, extending toward the second direction, and having both sides fixed to an inner surface of the housing in the second direction. The roll revolves in a predetermined direction on the axis.

The fixing part may including a holding rod extending toward the second direction and configured to hold the display part; first and second protrusions directly contacting with an outer periphery of the revolving part; and first and second supports configured to connect the first and second protrusions respectively with both sides of the holding rod in the second direction. The centers of the first and second supports may be connected with the housing and the holding rod plays seesaw complementarily with the first and second protrusions.

The roll may include first and second rails formed at both sides on an outer periphery of the roll in the second direction. The first and second rails may progress in spirals toward the second direction while the roll is revolving. The display part may be wound on the outer periphery of the roll between the first and second rails.

The first and second rails may be intaglios. The first and second protrusions may engage correspondingly with the first and second rails. The first and second protrusions may progress in the second direction along the spirals while the roll is revolving.

A depth of the intaglio may be smaller as the display part is going to be spread out. The first and second protrusions may ascend as the roll is revolving in a direction of spreading the display part. The holding rod may descend to press down the display part in correspondence with ascended the first and second protrusions.

The spirals of the first and second rails may be longer than the long side of the display part in the first direction.

The display apparatus may further include a plurality of elastic members each including at least one or more springs. The first and second pressing parts may be connected with an inner side of the upper housing by means of the elastic members. A bottom surface of the first pressing part may contact with a top surface of the first protrusion and a bottom surface of the second pressing part contacts with a top surface of the second protrusion. The first pressing part may be configured to press the first protrusion downward while the second pressing part may be configured to press the second protrusion downward.

The first and second pressing parts may correspond respectively to the first and second rails by length in the second direction.

The roll may including a circuit sheet configured to output image signals; an elastic circuit sheet configured to connect the circuit sheet with the display part; and a drive IC mounted on the elastic circuit sheet. The drive IC may be configured to convert the image signals, which are supplied from the circuit sheet, into drive signals to activate the display part.

In a second embodiment, a display apparatus may further include a lockup member disposed adjacent to the first and second rails and configured to fix the first and second protrusions.

The lockup member may have a bottom end shifting toward the second direction to be overlaid with the shallowest portion of the intaglios of the first and second rails over the first and second rails. The first and second protrusions ascended may be fixed along the first and second rails by means of the lockup member. The lockup member may be shaped in a letter 'L' in sight of the first direction.

In a third embodiment, the holding rod may be curved in the second direction. The grip and the opening may be curved in the second direction.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Further, it will be understood that similar interpretation will be applied to terminology, such as "connected to," "coupled to," "adjacent to," etc. Like reference numerals refer to like elements throughout.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
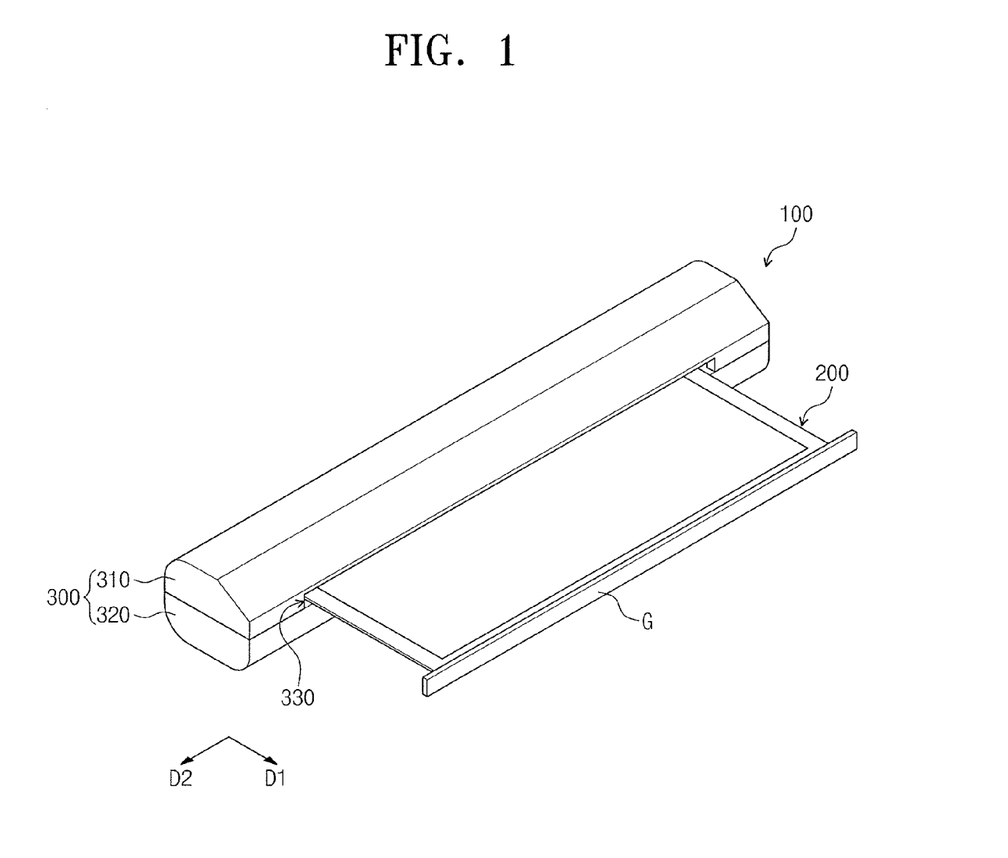
FIG. 1 illustrates a perspective view of a display apparatus according to an embodiment.
Figure 2:
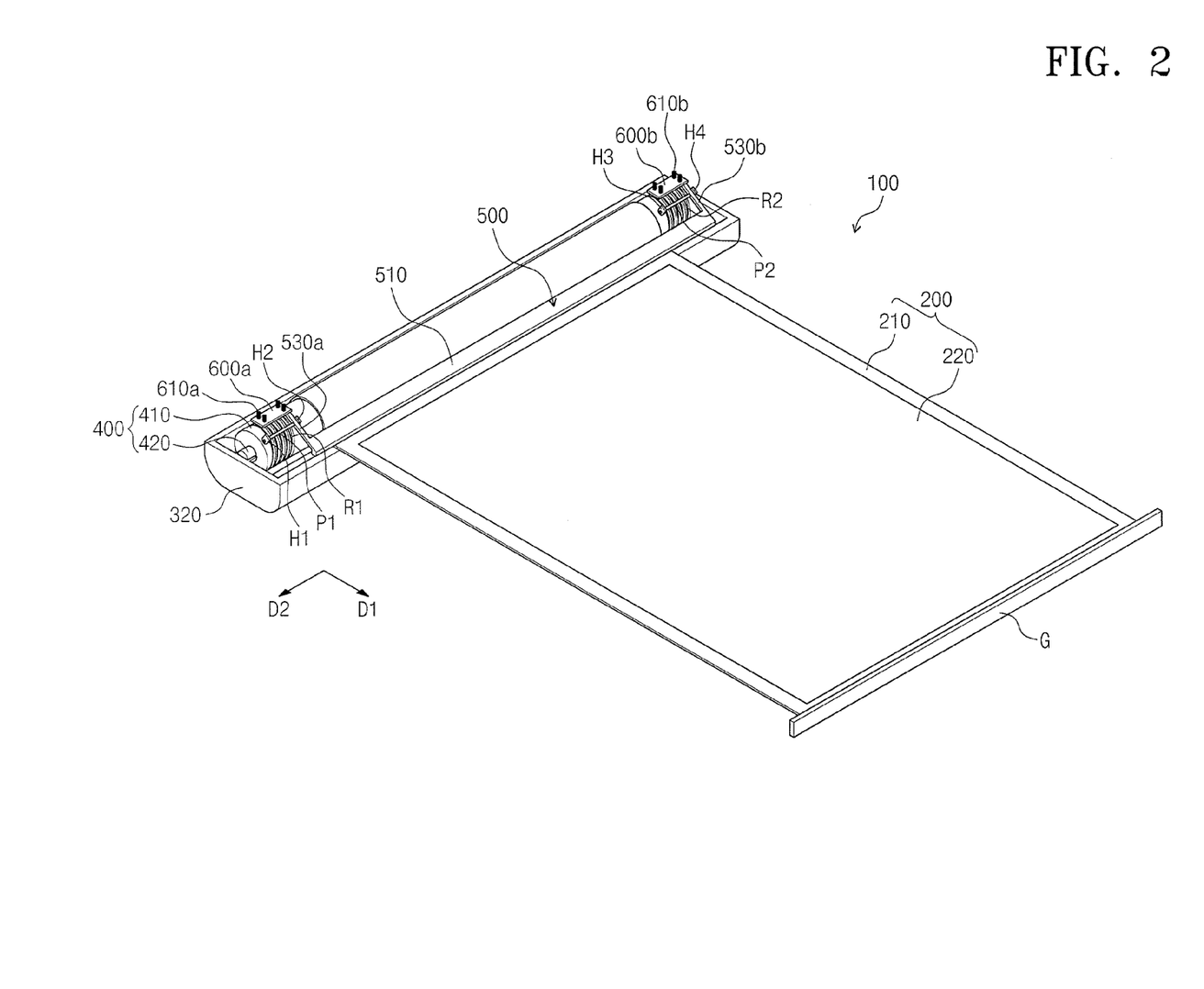
FIG. 2 illustrates an internal configuration of the display apparatus in FIG. 1.
Figure 3:
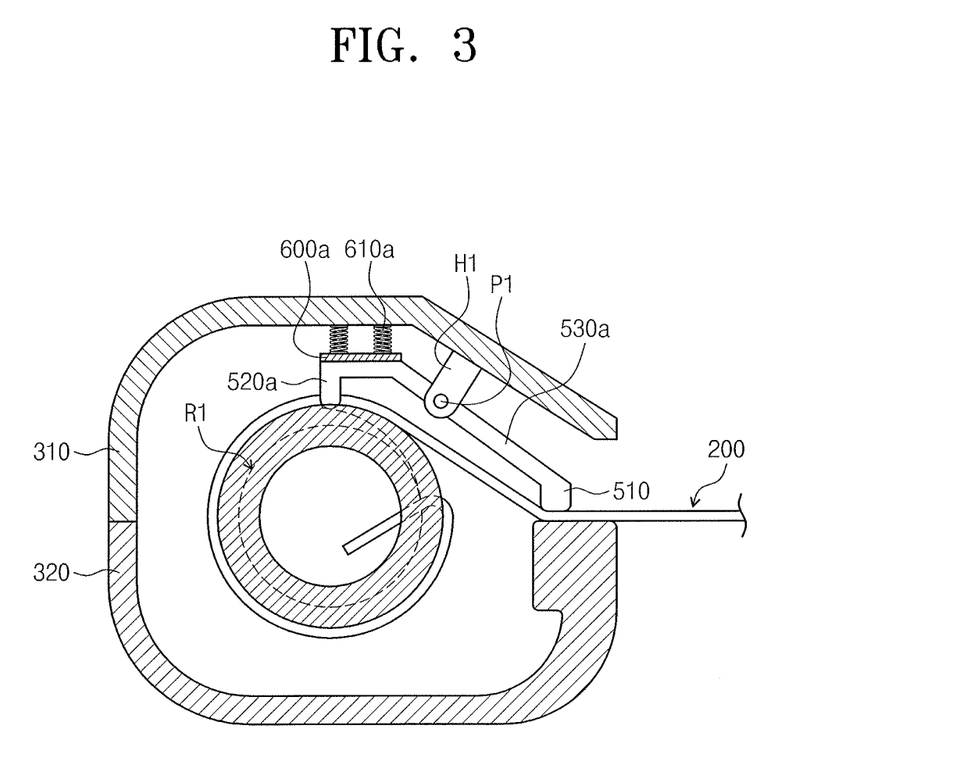
FIG. 3 illustrates a sectional view of the display apparatus in FIG. 1.

FIG. 1 illustrates a perspective view of a display apparatus according to an embodiment, FIG. 2 illustrates an internal configuration of the display apparatus shown in FIG. 1, and FIG. 3 illustrates a sectional view of the display apparatus in FIG. 1.

Referring to FIGS. 1 to 3, a display apparatus 100 may include a display part 200, a housing 300, a revolving part 400, a fixing part 500, and a pressing part 600.

In this embodiment, the display part 200 may be shaped as a rectangle. In detail, as illustrated in FIG. 2, the display part 200 may have long sides in a first direction D1, and short sides in a second direction D2 that intersects the first direction D1. The display part 200 may have flexibility and operate in rolling and unfolding states. That is, the display part 200 may be a flexible display unit. The display part 200 may roll in a direction that looks to the housing 300, and may spread to be released in reverse to a rolling direction. For example, the display part 200 may be pulled out from the housing 300 to spread away from the housing 300 (FIG. 2), and may be rolled toward the housing 300, e.g., while facing the housing 300, to be assembled and accommodated within the housing 300.

That is, referring to FIG. 2, in the first direction D1, the housing 300 may be disposed at a first side of the display part 200, and a grip G may be disposed at a second side of the display part 200. When a user pulls the grip G in the first direction D1, the display part 200 can be drawn out of the housing 300 from the inside of the housing 300.

As further illustrated in FIG. 2, the display part 200 may include an imaging part 210 and an insulation substrate 220. The imaging part 210 may be disposed on the insulation substrate 220.

The imaging part 210 may emit and control light to express, e.g., realize, images. The imaging part 210 may include diverse forms of display units adoptable in the flexible display apparatus. Exemplarily, the imaging part 210 may be one of electrophoretic, electrowetting, and organic light emission display units. The imaging part 210 for this embodiment may employ an organic light emission display unit.

The insulation substrate 220 may be formed of a transparent material, and may have flexibility. Exemplarily, the insulation substrate 220 may be made of polyimide.

As illustrated in FIG. 1, the housing 300 has short sides in the first direction D1 and long sides in the second direction D2. The housing 300 may receive, e.g., accommodate, the display part 200, the revolving part 400, the fixing part 500, and the pressing part 600 therein.

In detail, as illustrated in FIG. 1, the housing 300 may include an upper housing 310, a lower housing 320, and an opening 330. The upper housing 310 may be disposed over and joined with the lower housing 320. The upper and lower housings 310 and 320 may be shaped to form an integrated body.

The opening 330 is disposed at the side of the housing 300, which is opposite to the grip G in the first direction D1 of the display part 200. In detail, the opening 330 may extend along the second direction D2 in the side of the upper housing 310. The display part 200 may be drawn into and out of the housing 300 through the opening 330.

In the second direction D2, the grip G of the display part 200 may be longer than the opening 330. Additionally, although not shown, the grip G of the display part 200 may be higher than a height of the opening 300 in a direction normal to the first and second directions D1 and D2. Therefore, the grip G of the display part 200 is not drawn into the housing 300 through the opening 330.

Referring to FIG. 2, the revolving part 400 may include a roll 410 and an axis 420. The roll 410 may be shaped as a cylinder extending in the second direction D2. The display part 200 may be wound on the outer periphery of the roll 410. In other words, the roll 410 may act as a winding core of the display part 200.

The axis 420 is disposed at the center of the roll 410. The axis 420 may extend in the second direction D2, and both ends of the axis 420 may be linked-up with both ends of the housing 300 in the second direction D2. Therefore, the roll 410 may rotate on the axis 420 to wind the display part 200 therearound.

Although not shown, the roll 410 may include a circuit sheet, an elastic circuit sheet, and a drive integrated circuit (drive IC). The circuit sheet, the elastic circuit sheet, and the drive IC may be placed on the inner periphery of the roll 410. The drive IC may be mounted on the elastic circuit sheet. The circuit sheet may be connected with the display part 200 by way of the elastic circuit sheet. The circuit sheet outputs image signals. The image signals output from the circuit sheet may be supplied into the drive IC. The drive IC converts the image signals, which are supplied thereinto, into drive signals for activating the display part 200, and supplies the converted image signals to the display part 200.

A first rail R1 and a second rail R2 may be disposed on the outer periphery of the roll 410. In detail, the first rail R1 may be placed on the outer periphery of a first side of the roll 410 in the second direction D2, while the second rail R2 may be placed on the outer periphery of a second side of the roll 410 in the second direction D2. As such, a portion of the roll 410 wound with the display part 200 is an area between the first and second rails R1 and R2. The features of the first and second rails R1 and R2 will be further described below in conjunction with FIG. 4.

Referring to FIG. 3, the fixing part 500 includes a first protrusion 520a, a first support 530a, a first central pin P1, and first and second holding plates H1 and H2, adjacent to a first pressing part 600a at the first side of the roll 410, i.e., adjacent to the first rail R1. A second protrusion, a second support 530b, a second central pin P2, third and fourth holding plates H3 and H4, and a second pressing part 600b are positioned at the second side of the roll 410, and are configured similarly to the first protrusion 520a, the first support 530a, the first central pin P1, the first and second holding plates H1 and H2, and the first pressing part 600a. Thus, detailed description of the second protrusion, the second support 530b, the second central pin P2, the third and fourth plates H3 and H4, and the second pressing part 600b will not be repeated.

In detail, referring to FIGS. 2 and 3, the fixing part 500 includes a holding rod 510, the first and second protrusions, the first and second supports 530a and 530b, the first and second central pins P1 and P2, and the first through fourth holding plates H1, H2, H3 and H4.

The holding rod 510 is disposed in the housing 300, and extends in the second direction D2. In the opening 330, the holding rod 510 may fix, e.g., hold, the display part 200 thereat, e.g., press the display part 200 against the lower housing 320, while engaging with the top surface of the lower housing 320.

The first and second protrusions may be disposed to engage with the first and second rails R1 and R2. In detail, the first protrusion 520a may be placed on the outer periphery of the first side of the roll 410, while the second protrusion may be placed on the outer periphery of the second side of the roll 410. The features of the first and second rails R1 and R2 and the first and second protrusions 520a and 520b will be further described below in conjunction with FIG. 4.

As further illustrated in FIGS. 2-3, the first and second supports 530a and 530b are spaced apart from each other along the second direction D2, and are connected with both sides of the holding rod 510. For example, the first and second supports 530a and 530b may extend in the first direction D1. The first and second supports 530a and 530b connect the first and second protrusions with corresponding sides of the holding rod 510.

In detail, one side of the first support 530a is connected with the first protrusion 520a, while an opposite side of the first support 530a in the first direction D1 is connected to the holding rod 510 at the first side of the roll 410. Similarly, one side of the second support 530b is connected with the second protrusion 520b, while an opposite side of the second support 530b in the first direction D1 is connected with the holding rod 510 at the second side of the roll 410. Therefore, the holding rod 510 is opposite to the first and second protrusions, relative to the orientation of the first and second supports 530a and 530b, respectively.

Holes may be formed at the centers of the first and second supports 530a and 530b. The first and second central pins P1 and P2 may be correspondingly inserted respectively into the holes. In detail, the first central pin P1 may be inserted into the hole of the first support 530a, and the second central pin P2 may be inserted into the hole of the second support 530b. The first and second central pins P1 and P2 extend in the second direction D2, and may have a same length as or longer than the first and second rails R1 and R2, respectively, in the second direction D2.

In the second direction D2, both ends of the first and second central pins P1 and P2 are connected with the first through fourth holding plates H1, H2, H3, and H4 (H1~H4). In detail, both ends of the first central pin P1 are correspondingly connected with the first and second holding plates H1 and H2, respectively, in the second direction D2. Both ends of the second central pin P2 are correspondingly connected with the third and fourth holding plates H3 and H4, respectively in the second direction D2.

The first through fourth holding plates H1~H4 may be settled at the upper housing 310. Therefore, the first through fourth holding plates H1~H4 may help the first and second central pins P1 and P2 to be fixed at the upper housing 310.

As the first and second central pins P1 and P2 are inserted into the holes respective to the first and second supports 530a and 530b, the first and second supports 530a and 530b may move up and down over respective first and second central pins P1 and P2, e.g., as a seesaw. Additionally, the first and second supports 530a and 530b may also move in the second direction D2 along the first and second central pins P1 and P2, respectively. That is, the first and second supports 530a and 530b may move in the second direction D2 in a range that corresponds to each length of the first and second central pins P1 and P2, while the lengths of the first and second central pins P1 and P2 may be longer than or identical to motion ranges of the first and second supports 530a and 530b in the second direction D2. The motions of the first and second supports 530a and 530b will be further described below in conjunction with FIG. 4.

The first and second pressing parts 600a and 600b are connected with the upper housing 310 by way of first and second elastic members 610a and 610b, which are elongated upward. In detail, the top surface of the first pressing part 600a is connected with the inner surface of the upper housing 310 through the first elastic member 610a. The top surface of the second pressing part 600b is connected with the inner surface of the upper housing 310 through the second elastic member 610b elongated upward. The first and second elastic members 610a and 610b may respectively include at least a spring.

The bottom surfaces of the first and second pressing parts 600a and 600b may be placed to contact directly with the top surfaces of the first and second protrusions corresponding thereto respectively. In other words, the first and second pressing parts 600a and 600b are disposed on the top sides of the first and second protrusions, respectively, to press down the first and second protrusions. For example, as illustrated in FIG. 3, the bottom surface of the first pressing part 600a is on, e.g., directly on, the top surfaces of the first protrusion 520a, while the top surface of the first pressing part 600a is connected to the upper housing 310 through the first elastic member 610. As such, the strength of pressing the first and second protrusions correspondingly by the first and second pressing parts 600a and 600b is generated from elasticity of the first and second elastic members 610a and 610b.

In the second direction D2, as illustrated in FIG. 2, lengths of the first and second pressing parts 600a and 600b correspond to those of the first and second rails R1 and R2, respectively. Therefore, even while the first and second supports 530a and 530b are moving along the second direction D2, the first and second pressing parts 600a and 600b press the first and second protrusions 520a and 520b correspondingly.

Figure 4:
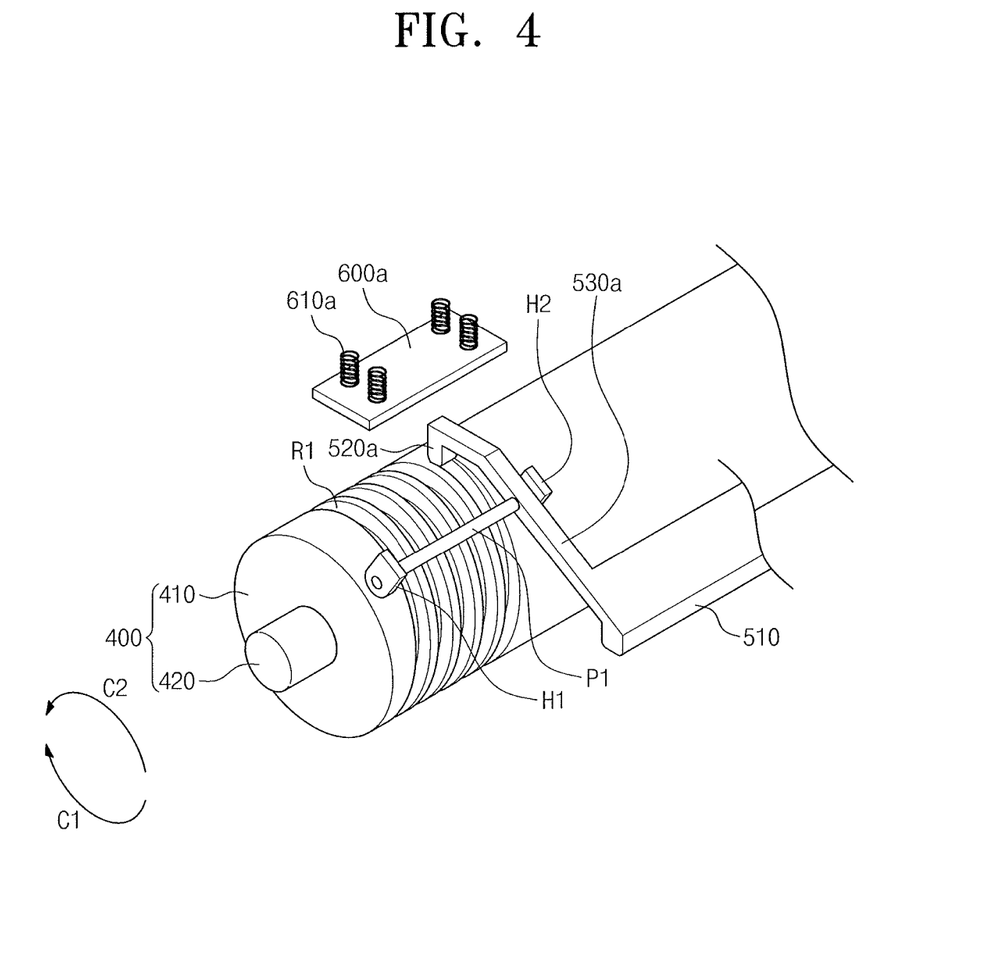
FIG. 4 illustrates the revolving part and the fixing part in FIG. 3.

FIG. 4 illustrates an enlarged expanded view of the revolving part 400 and the fixing part 500. FIG. 4 illustrates a configuration of the display apparatus with the first rail R1, the first protrusion 520a, the first support 530a, the first central pin P1, the first and second holding plates H1 and H2, and the first pressing part 600a in the second direction D2, for convenience of description. The second rail R2, the second protrusion, the second support 530b, the second central pin P2, the third and fourth holding plates H3 and H4, and the second pressing part 600b have the same structures as the first rail R1, the first protrusion 520a, the first support 530a, the first central pin P1, the first and second holding plates H1 and H2, and the first pressing part 600a, respectively.

Referring to FIG. 4, the first and second rails R1 and R2 are formed on the outer periphery of the roll 410. FIG. 4 delineates the first rail R1 representatively. The first and second rails R1 and R2 may be shaped in spirals progressing in the second direction D2 by revolution of the roll 410. For example, each of the first and second rails R1 and R2 may include a helical slit, e.g., a thread, wrapped around the roll 410 and continuously progressing along an entire length of the first and second rails R1 and R2, respectively, along the second direction D2. The spiral lengths of the first and second rails R1 and R2 may be longer than a length of the long side of the display part 200.

In detail, the first and second rails R1 and R2 may be formed in intaglio. The first protrusion 520a and the second protrusion may engage correspondingly with the first and second rails R1 and R2, e.g., the first protrusion 520a and the second protrusion may be inserted into respective helical slits of the first and second rails R1 and R2 to engage therewith. The first protrusion 520a may engage with the first rail R1, while the second protrusion may engage with the second rail R2.

Accordingly, upon revolution of the roll 410, the first and second protrusions can shift within the helical slit in the second direction D2, while engaging with the first and second rails R1 and R2 corresponding thereto. During this, as the centers of the first and second supports 530a and 530b are fixed at the first and second holding pins H1~H4, the first and second protrusions move not only in the second direction D2 but also in the first direction D1.

For example, FIG. 4 shows that the first protrusion 520a may be shifted from one spots to another in the second direction D2 as the roll 410 revolves in the clockwise direction C1. Since the first and second protrusions are pressed down by the first and second pressing parts 600a and 600b, respectively, the first protrusion 520a and the second protrusion are not derailed from the first and second rails R1 and R2.

A depth L1 (FIG. 5A) of the intaglios, i.e., helical slits, of the first and second rails R1 and R2 may decrease when nearing other spots of the first and second rails R1 and R2 in the second direction D2. Therefore, as the other spots of the first and second rails R1 and R2 in the second direction D2 approach, the first and second protrusions engaging with the first and second rails R1 and R2 move upward due to the decreased depth. This will be hereinafter further described in conjunction with FIGS. 5A and 5B.

Figure 5A:
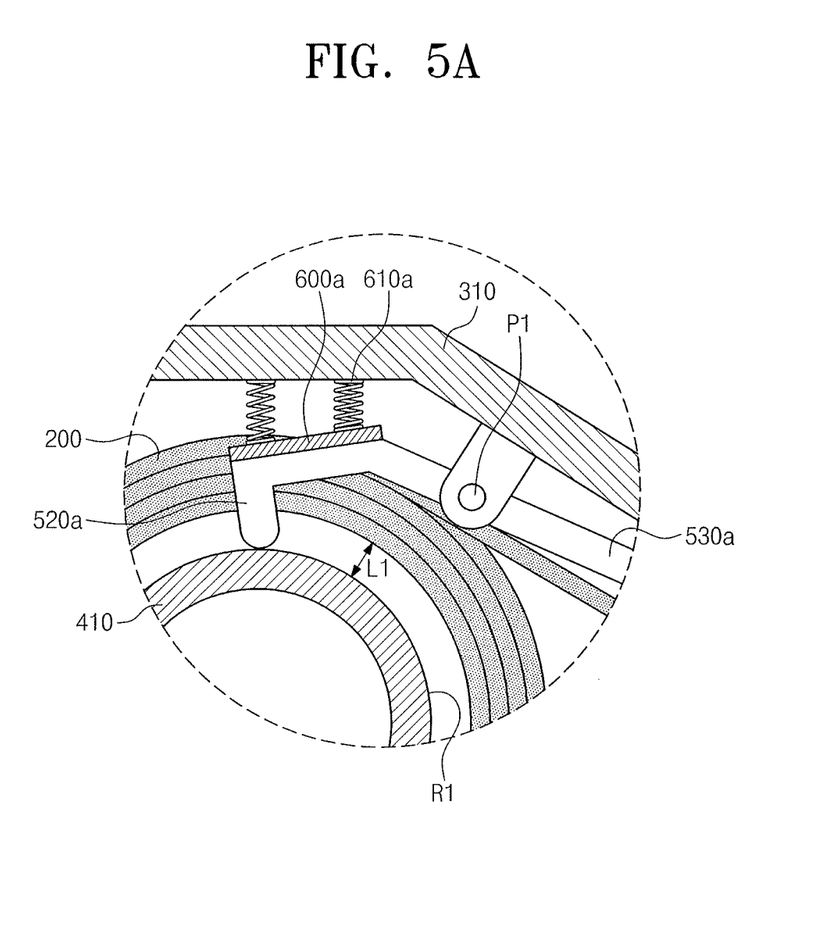
FIGS. 5A and 5B illustrate enlarged views of the fixing part and the pressing part.
Figure 5B:
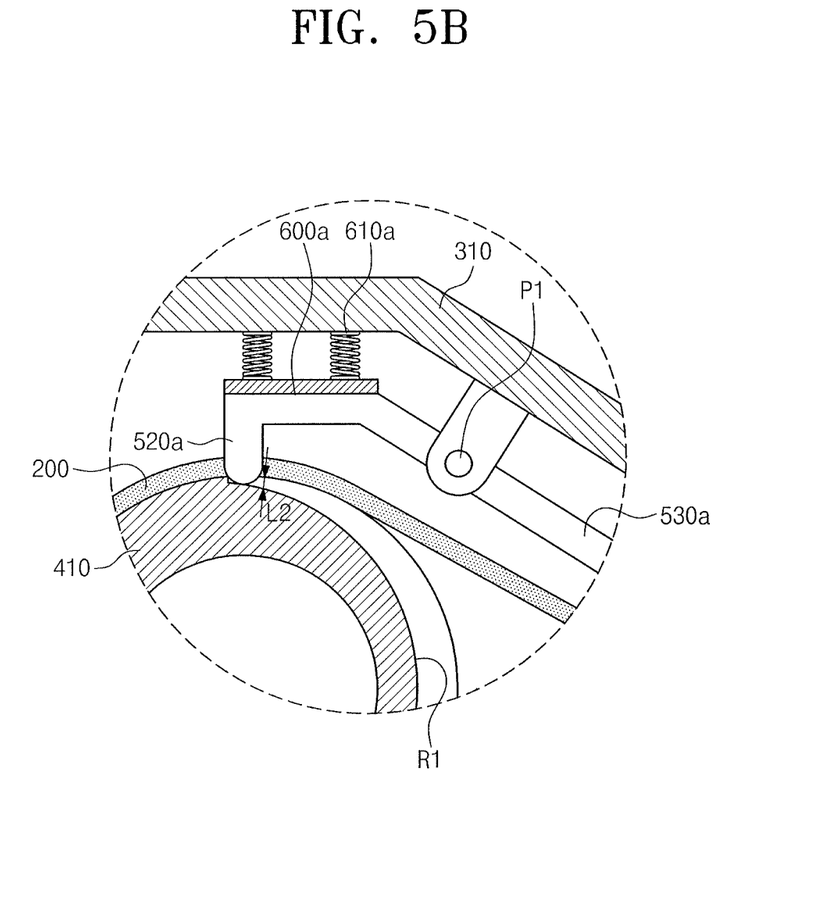

FIGS. 5A and 5B illustrate enlarged views of the fixing part 500 and the pressing part 600. For convenience, FIGS. 5A and 5B partly delineate the display apparatus, in the second direction D2, equipped with the first protrusion 520a, the first support 530a, the first central pin P1, the first and second holding plates H1 and H2, and the first pressing part 600a. The second rail R2, the second protrusion, the second support 600b, the second central pin P2, the third and fourth holding plates H3 and H4 and the second pressing part 600b have the same structures as the first rail R1, the first protrusion 520a, the first support 530a, the first central pin P1, the first and second holding plates H1 and H2, and the first pressing part 600a.

FIG. 5A illustrates an enlarged view of the fixing part 500 and the pressing part 600 when the display part 200 is wound on the roll 410. FIG. 5B illustrates an enlarged view of the fixing part 500 and the pressing part 600 when the display part 200 is fully spread out.

Referring to FIGS. 5A and 5B, the intaglio depth L1 of the first and second rails R1 and R2 may decrease in the second direction D2. In detail, the intaglio depth L1 of the first and second rails R1 and R2 when the display part 200 is wound on the roll 410 (FIG. 5A) is larger than the intaglio depth L2 of the first and second rails R1 and R2 when the display part 200 is fully spread out (FIG. 5B).

That is, when the display part 200 is wound on the roll 410, the first protrusion 520a engages with the intaglio of the first rail R1, which is formed on the outer periphery of the roll 410, and the second protrusion engages with the intaglio of the second rail R2. During this, as the first and second protrusions are pressed downwardly by the first and second pressing parts 600a and 600b, respectively, the first and second protrusions are not derailed from the first and second rails R1 and R2 corresponding respectively thereto.

When the display part 200 is fully spread out, the intaglio depth L2 of the first and second rails R1 and R2 becomes smaller. During this, the first and second protrusions engaging with the intaglio of the first and second rails R1 and R2 ascend, e.g., the first and second protrusions are pushed upwardly away from the roll 410 to have a larger portion of each of the first and second protrusions extend above a corresponding helical slit. When the first and second protrusions ascend, e.g., to contract the elastic members 610a and 610b against the upper housing 310, the holding rod 510 descends, e.g., pushed downwardly, by the first and second supports 530a and 530b due to the previously described seesaw mechanism. The descending holding rod 510 presses the display part 200 downwardly, thereby fixing, e.g., securing, it.

In detail, when using the display apparatus 100, a user pulls the display part 200 out of the housing 300 along the first direction D1 in order to fully spread out the display part 200. During this, an excessive force between the display part 200 and the circuit sheet of the roll 410 may be generated. Therefore, as the holding rod 510 of the fixing part 500 presses the display part 200 downwardly to fix, e.g., secure, it thereto, the excessive force from may be prevented from being applied between the display part 200 and the circuit sheet of the roll 410. Consequently, it may be possible to prevented or substantially minimize separation, i.e., disconnection, between the display part 200 and the circuit sheet of the roll 410.

Figure 6:
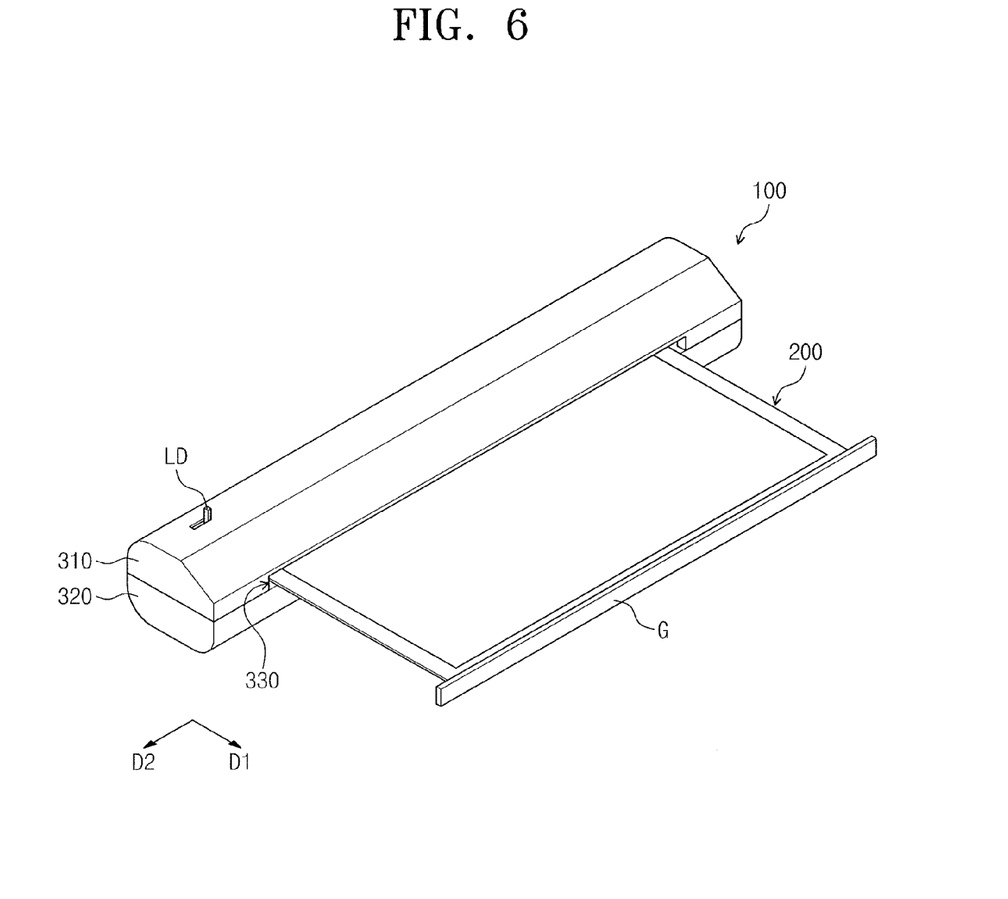
FIG. 6 illustrates a perspective view of a display apparatus according to another embodiment.
Figure 7:
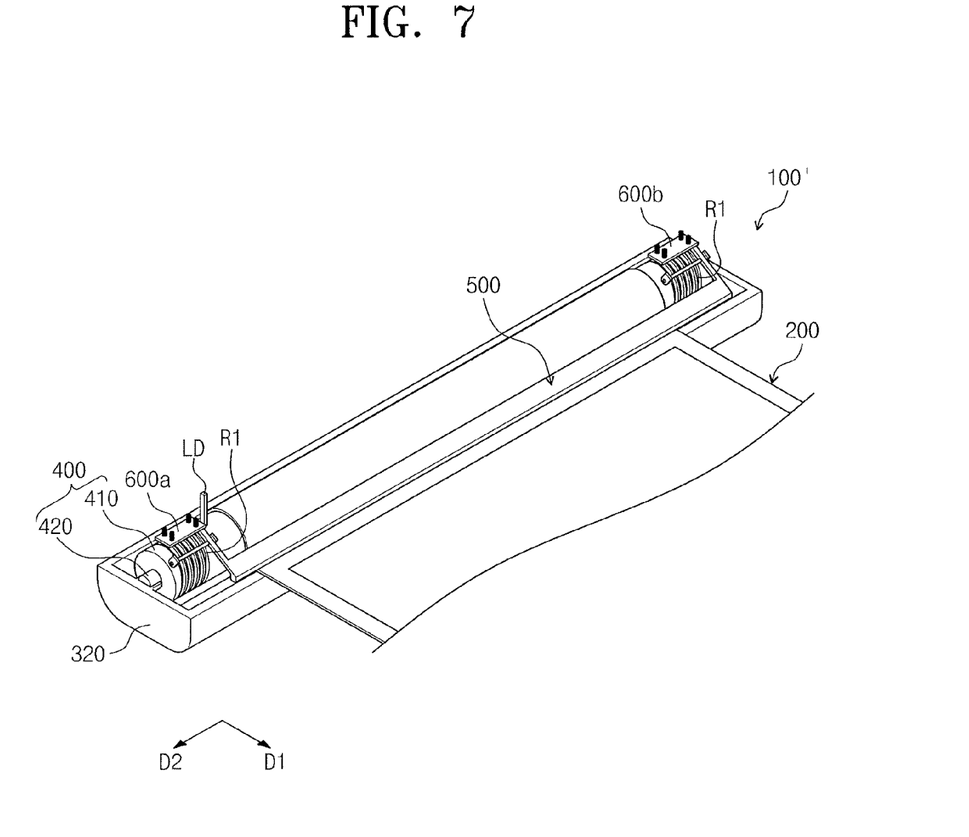
FIG. 7 illustrates an internal configuration of the display apparatus in FIG. 6.
Figure 8:
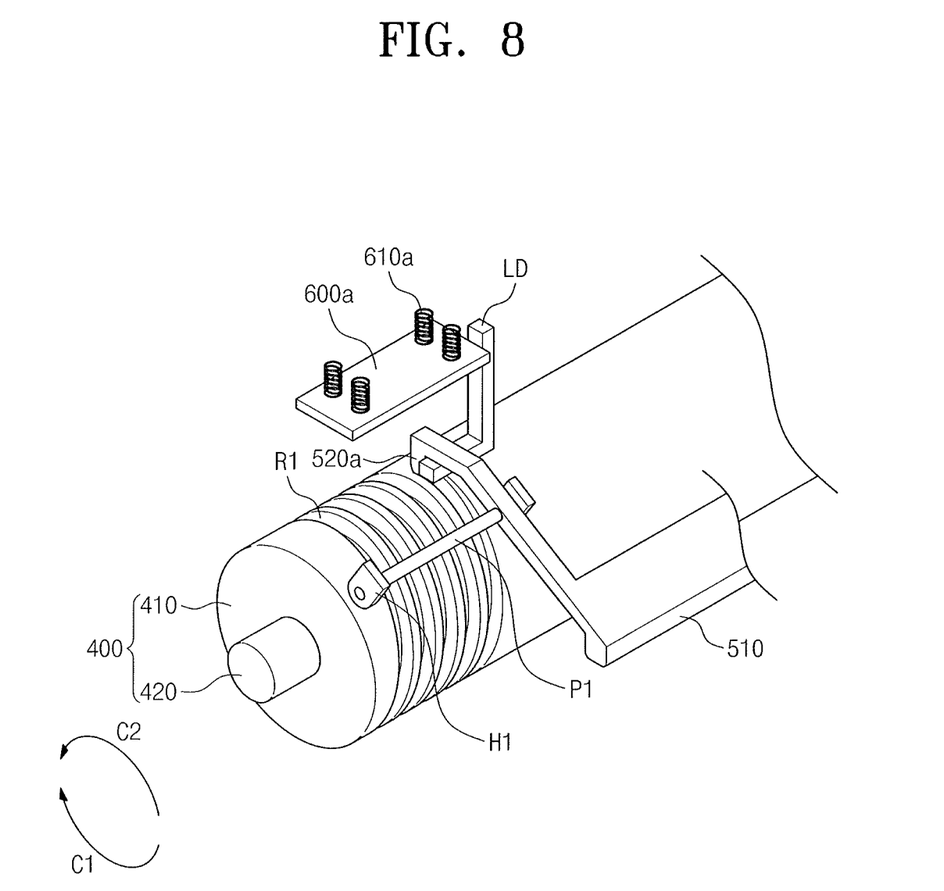
FIG. 8 illustrates the revolving part and the fixing part in FIG. 7.
Figure 9:
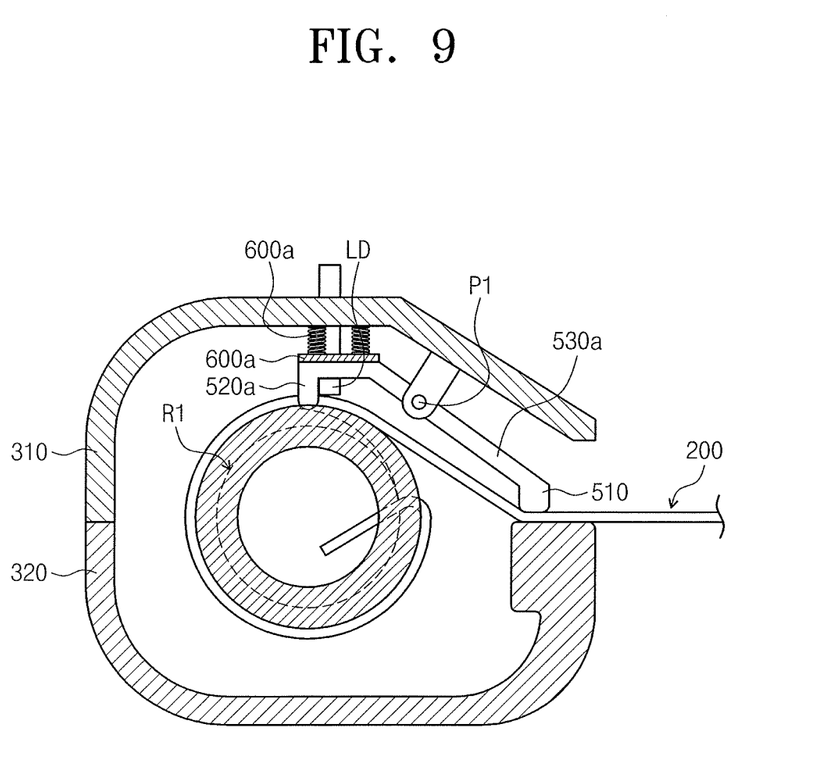
FIG. 9 illustrates a sectional view of the display apparatus in FIG. 7.

FIG. 6 illustrates a perspective view of a display apparatus according to a second embodiment, and FIG. 7 illustrates an internal configuration of the display apparatus shown in FIG. 6. FIG. 8 illustrates an enlarged view of the revolving part and the fixing part in FIG. 7, and FIG. 9 is a sectional view of the display apparatus shown in FIG. 7. In the description of FIGS. 6 through 9, detailed repetitive description of aforementioned components will not be repeated.

Referring to FIGS. 6 through 9, a display apparatus 100' according to the second embodiment may substantially be the same as the display apparatus 100 in FIGS. 1-5B described previously, with the exception of further including at least one lockup member LD. The lockup member LD may be L-shaped, as illustrated in FIG. 8.

In detail, the lockup member LD may be disposed adjacent to the upper housing 310. Exemplarily, as illustrated in FIG. 6, the upper housing 310 may include at least one hole, and the lockup member LD may penetrate through the hole of the upper housing 310. As illustrated in FIGS. 6-7, a bottom end of the lockup member LD may be inside the upper housing 310, while a top end extends through the hole above the upper housing 310.

FIG. 6 illustrates the display apparatus 100 in which the lockup member LD is coupled. In detail, when the display part 200 is fully spread out, the first and second protrusions, which are in an ascended state, are maintained at a stable state, by the first and second pressing parts 600a and 600b. When the display part 200 is rewound on the roll 410, the first and second protrusions are pushed down by the pressing parts 600a and 600b to be in a descended state. Once winding the roll 410 is complete, the lockup member LD may prevent the roll 410 from rolling in an opposite direction.

In detail, as illustrated in FIGS. 7-8, the lockup member LD is disposed adjacent to the first rail R1 in the second direction D2. The lockup member LD may shift toward the first rail R1 in the second direction D2, so a bottom end of the lockup member LD overlaps a portion of first rail R1 in the second direction D2. When the lockup member LD shifts toward the first rail R1, a bottom portion of the lockup member LD slides under the fixing part 500, e.g., the bottom portion of the lockup member LD may be between the first rail R1 and the flat top surface of the first protrusion 520a (FIGS. 8-9). As such, when the lockup member LD overlaps the first rail R1, the bottom portion of the lockup member LD blocks movement of the first protrusion 520a along the first rail R1 (FIGS. 8-9). Therefore, the lockup member LD may force the roll 410, which has completely rotated in the clockwise direction C1, not to revolve in the counterclockwise direction C2. Consequently, the display apparatus 100 according to the second embodiment of prevents the display part 200 from being inadvertently rewound on the roll 410, by using the lockup member LD, after the display part 200 has been spread out.

Figure 10:
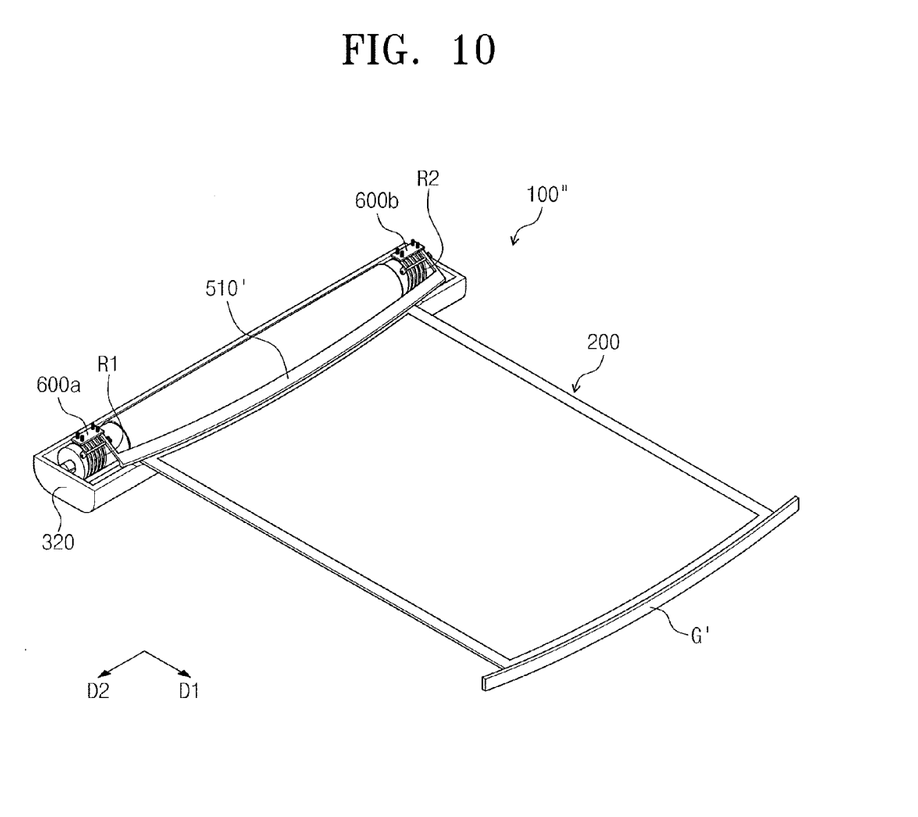
FIG. 10 illustrates a perspective view of a display apparatus according to yet another embodiment.

FIG. 10 illustrates a perspective view of a display apparatus according to a third embodiment.

Referring to FIG. 10, a display apparatus 100" according to the third embodiment is the same as the display apparatus 100 in FIGS. 1-5B, with the exception of having a holding rod 510' that is curved. In detail, the holding rod 510' may be shaped as a curve along the second direction D2. Corresponding to the holding rod 510', a grip G' of the display part 200 and the opening of the housing 300 may also be shaped as curves along the second direction D2. As the curved holding rod 510' affixes the display part 200, the display part 200 may be spread in a curve. In detail, the spread display part 200 may be shaped as a plane in the first direction D1, but shaped as a curve in the second direction D2.

The display part 200 spread out in a flat shape may be folded or bent by external force. However, when the display part 200 is spread out in a curved shape, tensile or compressive stress corresponding to such external force may be generated on the curved surface of the display part 200. In other words, as the curve of the display part 200 acts to generate tensile or compressive stress, folding or bending of the display part 200 due to such external stress may be prevented or substantially minimized. Therefore, a curved display part 200 may provide increased stability in a spread. Consequently, the display apparatus 100" according to the third embodiment may prevent the display part 200 from folding due to external force.

As described above, the display apparatus according to the embodiments of the inventive concept is advantageous to improving its facility for use.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display apparatus, comprising:
   a flexible display part expressing images;
   a housing accommodating the display part, the display part being drawn into and out of the housing;
   a revolving part in the housing, the display part being wound on the revolving part in a predetermined rotation direction;
   a fixing part in the housing, the fixing part securing the display part when fully spread out; and
   a pressing part connected to an interior of the housing, the pressing part pressing the fixing part toward the revolving part,
   wherein the fixing part includes:
      a holding rod extending in a longitudinal direction of the housing to hold the display part,
      first and second protrusions contacting an outer periphery of the revolving part, the protrusions being spaced apart from each other along the longitudinal direction of the housing, and
      first and second supports connecting the first and second protrusions to respective edges of the holding rod, centers of the first and second supports being connected to the housing, and the holding rod moving in accordance with a seesaw mechanism with the first and second protrusions, and
   wherein the holding rod presses the display part to fix the display part when spread out beyond a predetermined value.

2. The display apparatus according as claimed in claim 1, further comprising a grip connected to the display part, wherein:
   the display part includes a long side extending along a first direction, and a short side extending along a second direction,
   a first side of the display part is connected to the housing in the first direction, and
   a second side of the display part is connected to the grip in the first direction.

3. The display apparatus according as claimed in claim 2, wherein the housing includes an opening, the display part being drawn into and out of the opening.

4. The display apparatus according as claimed in claim 3, wherein the housing further comprises:
   an upper housing; and
   a lower housing connected with a bottom of the upper housing, the opening being in a lateral side of the upper housing and extending in the second direction.

5. The display apparatus according as claimed in claim 4, wherein the grip is longer than the opening in the second direction.

6. The display apparatus according as claimed in claim 5, wherein the revolving part includes:
   a roll shaped as a cylinder extending in the second direction, the display part being wound on an outer surface of the roll; and
   an axis penetrating the roll in the second direction, opposite edges of the axis in the second direction being fixed to an inner surface of the housing, and the roll revolving in a predetermined direction around the axis.

7. The display apparatus according as claimed in claim 6, wherein:
   the roll includes first and second rails on an outer periphery of the roll at opposite ends in the second direction,
   the first and second rails progress in spirals in the second direction while the roll is revolving, and
   the display part is wound on the outer periphery of the roll between the first and second rails.

8. The display apparatus according as claimed in claim 7, wherein the first and second rails include intaglios, the first and second protrusions being engaged with the first and second rails, respectively, and the first and second protrusions progress in the second direction along the spirals while the roll is revolving.

9. The display apparatus according as claimed in claim 8, wherein:
   a depth of the intaglio decreases as the display part is spread out,
   the first and second protrusions ascend as the roll is revolving in a direction of spreading the display part, and
   the holding rod descends and presses down the display part in correspondence with the ascended first and second protrusions.

10. The display apparatus according as claimed in claim 9, wherein the spirals of the first and second rails are longer than the long side of the display part in the first direction.

11. The display apparatus according as claimed in claim 10, further comprising a plurality of elastic members, each elastic member including at least one springs, wherein:
    the first and second pressing parts are connected with an interior of the upper housing via the elastic members,
    a bottom surface of the first pressing part contacts a top surface of the first protrusion, and a bottom surface of the second pressing part contacts a top surface of the second protrusion, and
    the first pressing part presses the first protrusion downwardly, while the second pressing part presses the second protrusion downwardly.

12. The display apparatus according as claimed in claim 11, wherein the first and second pressing parts correspond respectively to the first and second rails by length along a longitudinal direction of the housing.

13. The display apparatus according as claimed in claim 6, wherein the roll includes:
    a circuit sheet to output image signals;
    an elastic circuit sheet to connect the circuit sheet with the display part; and
    a drive IC on the elastic circuit sheet, the drive IC converting the image signals, which are supplied from the circuit sheet, into drive signals to activate the display part.

14. The display apparatus according as claimed in claim 7, further comprising a lockup member adjacent to the first and second rails, the lock up member affixing the first and second protrusions.

15. The display apparatus according as claimed in claim 14, wherein the lockup member has a bottom end movable in the second direction to overlap the first and second rails, the lockup member blocking movement of the first and second protrusions along the first and second rails.

16. The display apparatus according as claimed in claim 15, wherein the lockup member is L-shaped.

17. The display apparatus according as claimed in claim 1, wherein the holding rod is curved in the second direction.

18. The display apparatus according as claimed in claim 17, wherein the grip and opening are curved in the second direction.

19. A display apparatus, comprising:
a flexible display part expressing images;
a housing accommodating the display part, the display part being drawn into and out of the housing;
a revolving part in the housing, the display part being wound on the revolving part in a predetermined rotation direction;
a fixing part in the housing, the fixing part seceding the display part when fully spread out;
a pressing part connected to an interior of the housing, the pressing part pressing the fixing part toward the revolving part; and
a lockup member adjacent to the revolving part,
wherein the revolving part includes first and second rails at opposite ends of the revolving part, the display part being wound on the revolving part between the first and second rails,
wherein the fixing part further includes first and second protrusions engaged with the first and second rails, respectively, to progress along the first and second rails while the revolving part is revolving, and
wherein the lockup member is adjacent to the first and second rails to affix the first and second protrusions.

20. A display apparatus, comprising:
a flexible display part expressing images;
a housing accommodating the display part, the display part being drawn into and out of the housing;
a revolving part in the housing, the display part being wound on the revolving part in a predetermined rotation direction;
a fixing part in the housing, the fixing part including a holding rod along a longitudinal direction of the housing to secure the display part when fully spread out; and
a pressing part connected to an interior of the housing, the pressing part pressing the fixing part toward the revolving part,
wherein the revolving part includes first and second rails at opposite ends of the revolving part, the display part being wound on the revolving part between the first and second rails,
wherein the first and second rails include intaglios, a depth of the intaglio decreases as the display part is spread out, and
wherein the fixing part further includes first and second protrusions, first ends of the first and second protrusions being connected to the holding rod, and second ends of the first and second protrusions being engaged with the intaglio of the first and second rails, respectively, to progress along the intaglio while the revolving part is revolving.

* * * * *